Oct. 13, 1925. 1,556,891
R. H. AHLERS ET AL
APPARATUS FOR MAKING ARMATURES
Filed Nov. 20, 1923 5 Sheets-Sheet 3
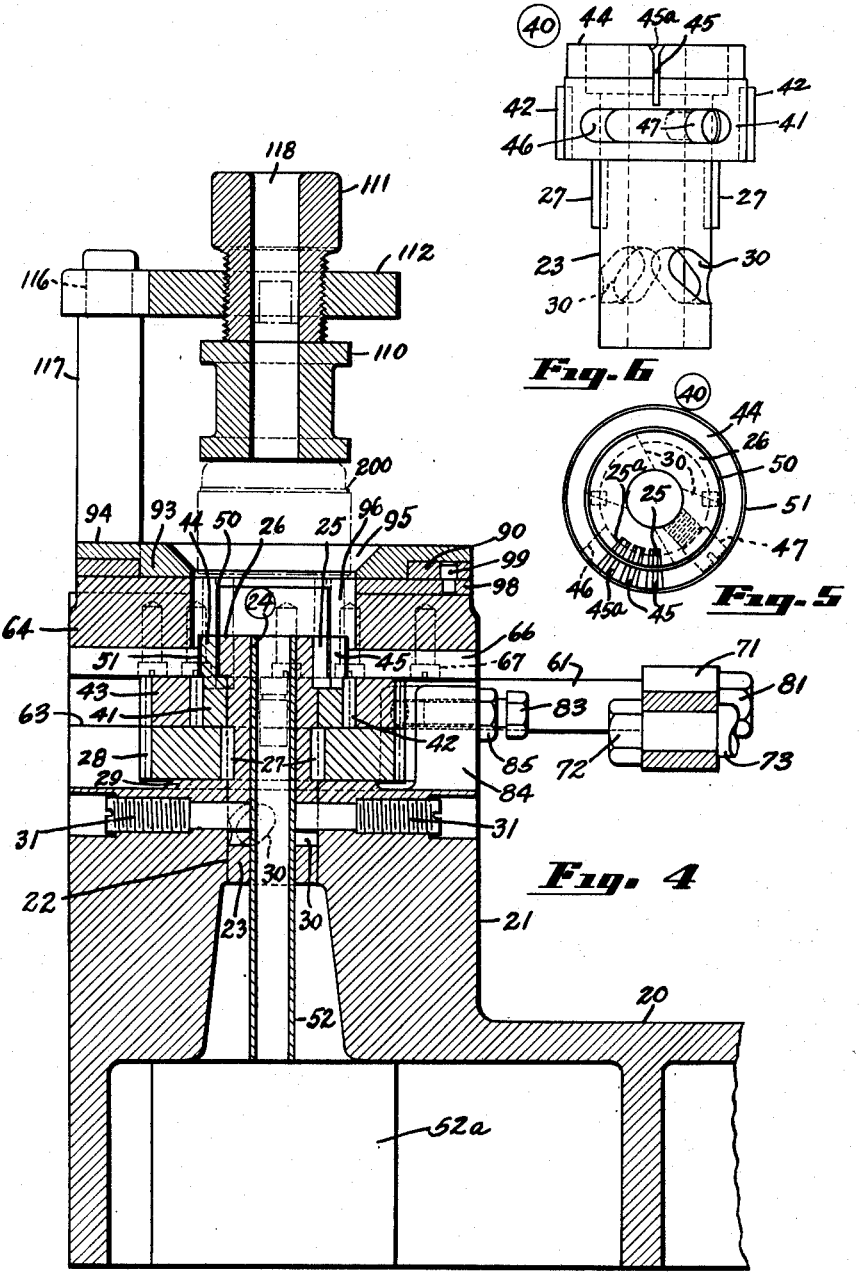
Inventors
Robert H. Ahlers and
Earl M. Polk
By Spencer Suvall and Hardman
their Attorneys

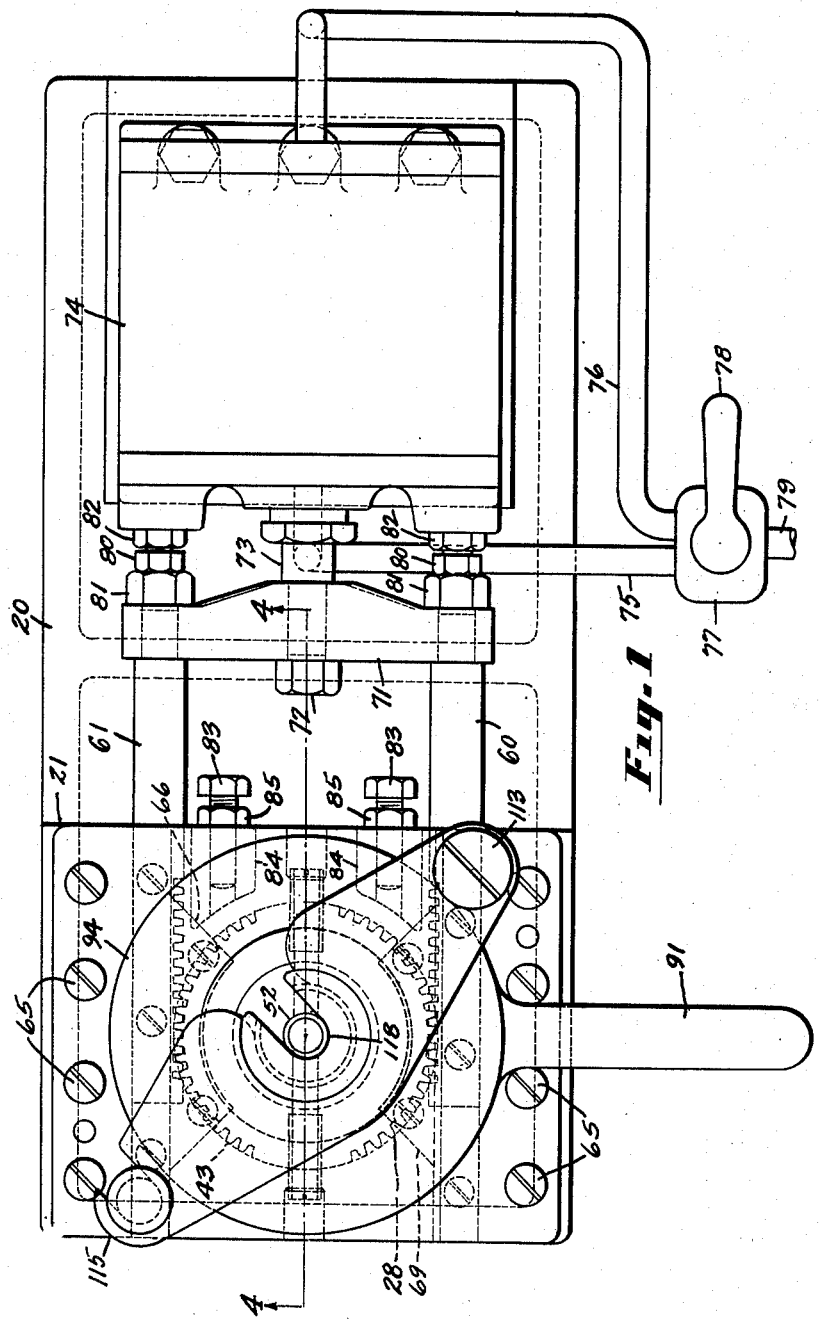

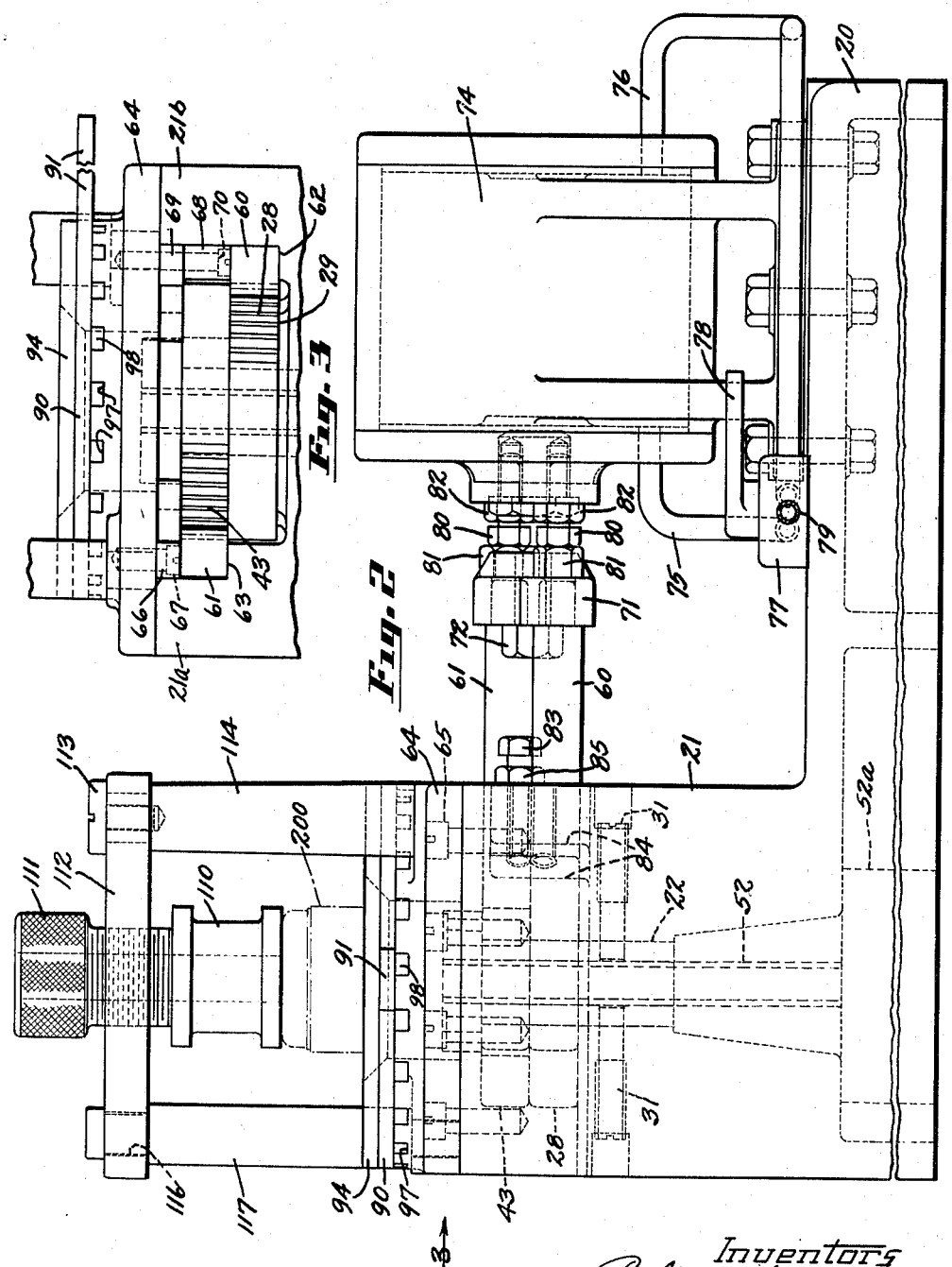

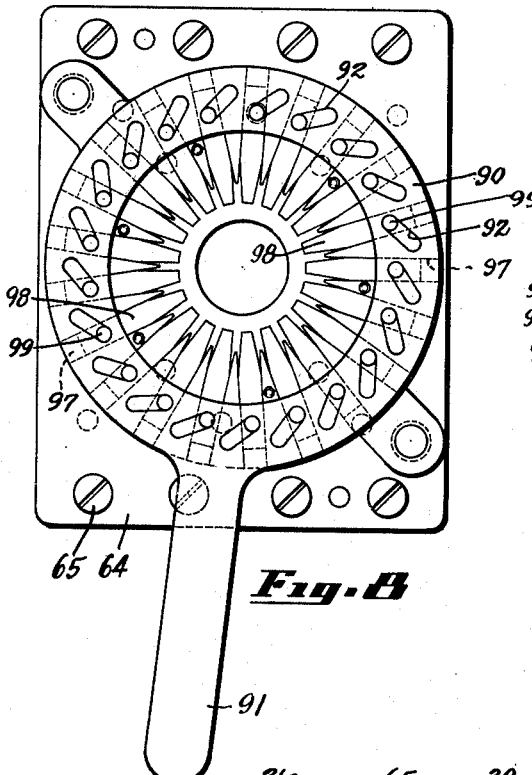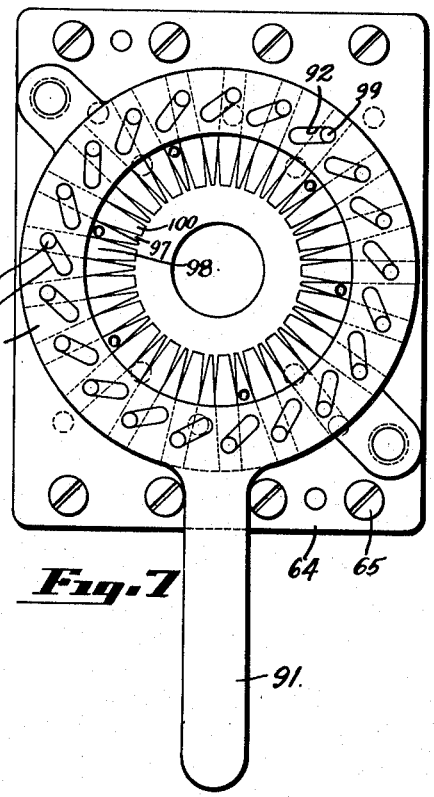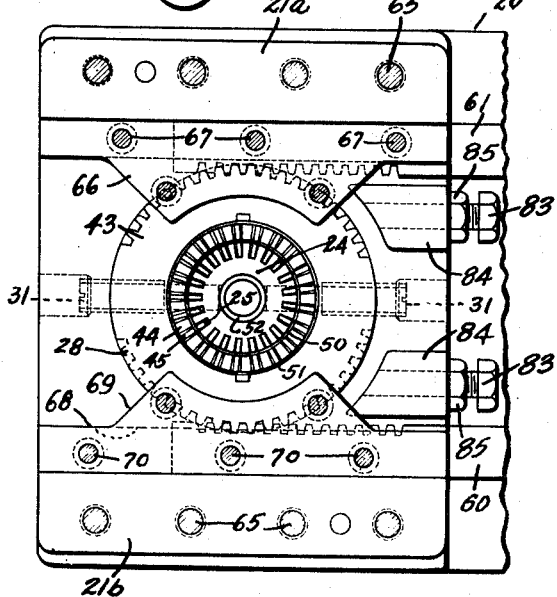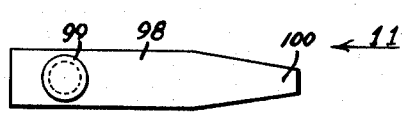

Oct. 13, 1925.　　　　　　　　　　　　　　　　1,556,891
R. H. AHLERS ET AL
APPARATUS FOR MAKING ARMATURES
Filed Nov. 20, 1923　　　5 Sheets-Sheet 5

Inventors
Robert H. Ahlers and
Earl M. Polk
By Spencer Jurall and Hardman
their Attorneys Patented Oct. 13, 1925.

1,556,891

UNITED STATES PATENT OFFICE.

ROBERT H. AHLERS AND EARL M. POLK, OF DAYTON, OHIO, ASSIGNORS TO THE DAYTON ENGINEERING LABORATORIES COMPANY, OF DAYTON, OHIO, A CORPORATION OF OHIO.

APPARATUS FOR MAKING ARMATURES.

Application filed November 20, 1923. Serial No. 675,969.

*To all whom it may concern:*

Be it known that we, ROBERT H. AHLERS and EARL M. POLK, citizens of the United States of America, residing at Dayton, county of Montgomery, State of Ohio, have invented certain new and useful Improvements in Apparatus for Making Armatures, of which the following is a full, clear, and exact description.

This invention relates to the manufacture of armatures, and particularly of the type of armature having single turn bar conductors having parallel branches which are received by spaced slots in the armature core. The commutator bars with which the branches are connected are generally angularly displaced in opposite directions respectively from the core slots which contain these branches so that it is necessary to twist or bend the branches of the conductor in order angularly to off-set the portion of the branch connected with the commutator with that portion of the branch which is located in a core slot.

One object of the invention is to twist the conductor ends or leads simultaneous in order to align them radially with their proper commutator bars, while at the same time causing the leads to bend when they emerge from the commutator core in such a manner that the insulation of the conductors is not materially weakened.

Other and further objects and advantages of the present invention will be apparent from the following description, reference being had to the accompanying drawings wherein a preferred embodiment of the present invention is clearly shown.

In the drawings:

Figure 1 is a plan view of a machine embodying one form of the invention.

Fig. 2 is a side elevation thereof.

Fig. 3 is a fragmentary end view looking in the direction of arrow 3 in Fig. 2.

Fig. 4 is a fragmentary sectional view on line 4—4 of Fig. 1.

Fig. 5 is a plan view of elements for twisting the ends of armature conductors.

Fig. 6 is a side elevation of parts shown in Fig. 5.

Fig. 7 is a plan view showing in non-operative position apparatus for holding certain of the armature conductors and providing bending forms while the conductors are being twisted.

Fig. 8 is a view similar to Fig. 7 showing the parts in operating position.

Fig. 9 is a plan view of the mechanism for twisting the armature conductors.

Fig. 10 is a plan view of one of the forming slides shown in Figs. 7 and 8.

Fig. 11 is an end view thereof, looking in the direction of the arrow 11 in Fig. 9.

The results sought to be accomplished by the present invention will first be described with reference to Figs. 12 to 15.

Figure 12:
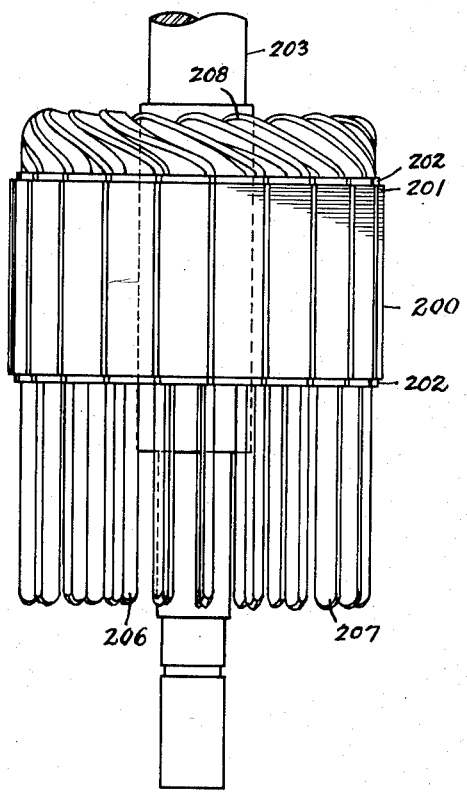
Figs. 12 and 13 are plan and end views respectively of an armature core with conductors assembled thereon in condition prior to the conductor twisting operation.
Figure 13:
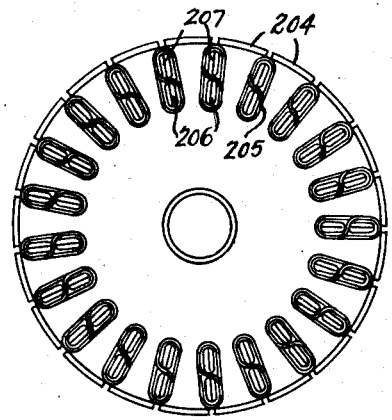
Figure 15:
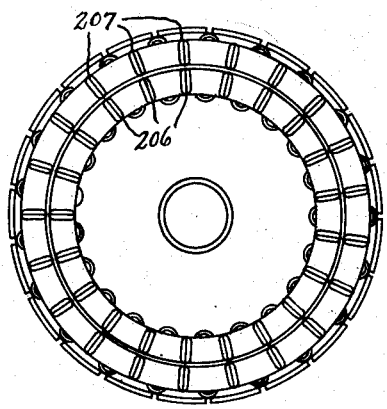

An armature core 200 comprising a plurality of iron laminations 201, and non-conducting end laminations 202, is mounted on an armature shaft 203. The core laminations 202 and 201 are notched to provide spaced teeth 204 so that a slotted core is produced. The slots in the core are lined with insulating material 205 and receive the branches 206 and 207 of armature hair pin conductors. Each conductor includes a yoke portion 208 which joins the branches 207 and 206. The portions 206 and 207 are substantially oblong in section and are disposed radially in the slots as shown in Fig. 12, the branch 206 being at the bottom of the slot and the branch 207 at the top of a slot which is spaced from the slot receiving the branch 206. The function of the machine is to displace the ends of the branches 206 the same angular distance in one direction of rotation and the branches 207 the same angular distance in the opposite direction of rotation. In other words, as shown in Fig. 13, all of the outer conductor leads are twisted clockwise as viewed in Fig. 12 or looking up from the bottom of Fig. 13, and all of the inner leads are twisted in the opposite direction. The end portion of each lead is maintained substantially straight and parallel with the axis of the shaft 203 for a substantial distance and the outer lead ends are radially alined with the inner lead ends.

Figure 14:
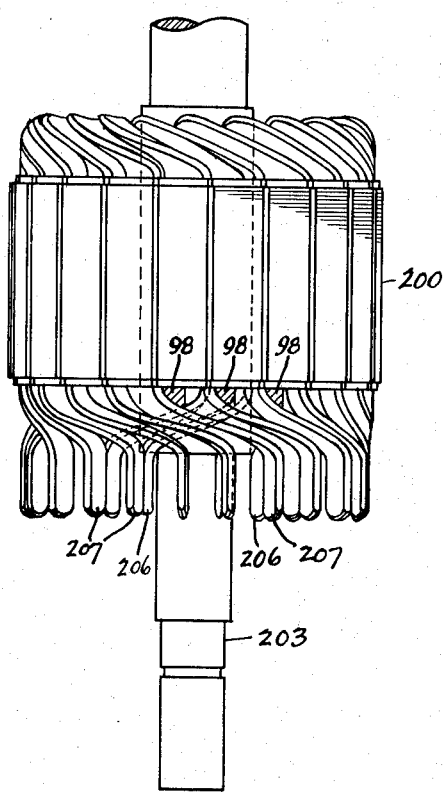
Figs. 14 and 15 are plan and end views respectively showing the armature conductors after the twisting operation performed by the machine to be described.

The machine also provides for the inserting at 98 in Fig. 14 of a plurality of forming members around which the outer leads are bent during the twisting operation. As the outer leads are twisted through a greater linear distance than the inner leads on account of the difference in radius from the center of the shaft, it has been found desirable to cause the outer leads to bend over a radius of easy curvature where these leads emerge from the core. If such a bending form is not provided, the outer lead will bend relatively abruptly where it emerges from the core, and there is danger of breaking the insulation at that point which would result in short circuits.

In order that the machine will function to produce the results described, the machine includes apparatus for simultaneously twisting the inner and outer conductor leads in opposite directions, and apparatus for inserting forming members between the outer leads at the point where they emerge from the core.

Lead twisting mechanism.

The machine includes a base 20 from which rises a pedestal 21 providing a bearing 22 which receives the hub 23 of an inner twisting member 24 for twisting the inner conductor leads 206. Member 24 is provided with a plurality of equally spaced notches 25 which are cut in from the periphery of a head portion 26 of member 24. These notches extend parallel to the axis of member 24 and also radially thereof. Member 24 is attached by means of keys 27 connected with hub 23 to a segment 28 which rests upon a boss 29 provided by the pedestal 21. The hub 23 is provided with diametrically opposite spiral slots 30 which cooperate with diametrically opposite pins 31 attached to the pedestal 21. Obviously rotation of the member 24 in a certain direction will cause it to move upwardly with respect to the bearing 22.

The outer twisting member 40 for twisting the outer armature conductor leads 207 includes a hub 41 which is journalled upon the hub 23 of member 24. The hub 41 carries keys 42 which slide in key-ways provided in a segment gear 43 which rests upon the gear 28. The member 40 includes an annular flange 44 which is provided with a series of equi-distant notches 45 which normally are located radially opposite the notches 25 of member 24 and extend parallel therewith and are of the same depth as the notches 25. The surfaces adjacent the upper ends of these notches are beveled at 25ª and 45ª to facilitate the entrance of the ends of the armature leads into these notches. The hub 41 is provided with an arcuate slot 46 which receives a pin 47 screw threaded into the hub 23 of the twisting member 24. The space between the head of the twisting member 24 and the flange 44 of member 40 is occupied by a thin walled cylindrical member 50. The flange 44 is surrounded by a band 51.

The hub 23 of member 24 is hollow and receives a tube 52 for holding an end of an armature shaft. The tube is interchangeable with tubes of various bores to accommodate shafts of different diameters. The tube 52 is held in any suitable manner as by a block 52ª.

The mechanism for turning the segments 28 and 43 in opposite directions simultaneously includes racks 60 and 61 respectively which slide in ways 62 and 63 provided by the pedestal 21. The pedestal 21 supports the base 64 of the apparatus for inserting the forming members which will be described later. This base is secured to the posts 21ª and 21ᵇ of pedestal 21 by means of screws 65. A retaining plate 66 is attached to base 64 by means of screws 67 and serves to limit the upward movement of the rack 61 and gear 43. A spacing block 68 and a retaining plate 69 are attached to the base 64 by means of screws 70; and block 68 prevents upward movement of the rack 60 while block 69 prevents upward movement of the gear 43. The racks 60 and 61 are connected by a yoke 71 attached by a nut 72 to a piston rod 73 extending within a cylinder 74 and connected with a piston not shown. In order to move the piston, a fluid under pressure is introduced into opposite ends of cylinder 74 through pipes 75 and 76. The admission of pressure fluid through these pipes is controlled by valve mechanism 77 operated by a lever 78 and connected with a source of pressure supply by means of a pipe 79.

Movement to the right as viewed in Fig. 1 of the racks 60 and 61 is limited by means of screws 80 threaded into a wall of the cylinder 74 and located in alinement so as to be engaged by nuts 81 which are used to attach the yoke 71 to the racks 60 and 61. The screws 80 may be screwed into or out of the cylinder 74 in order to change the limit of movement to the right and these screws are held in adjusted position by means of nuts 82. Movement of the racks 60 and 61 to the left, as viewed in Fig. 1, is limited by the engagement of the yoke 71 with the heads of screws 83 threaded into bosses 84 provided by the pedestal 21. The screws 83 are held in position by lock nuts 85.

Apparatus for inserting forming members.

The apparatus for inserting forming members between the outer conductor leads in order that these leads may be bent around the forming members during the twisting operation includes a ring 90 provided with a handle 91 and a circular row of inclined slots 92. This ring is journalled upon the cylindrical boss 93 of a plate 94 which is attached to the base 64. The base 64 and plate 94 are provided with alined openings 95 and 96 respectively which are coaxial with the member 24. The base 64 is provided with a plurality of radially extending equi-distant grooves 97, each of which receives a slide 98 provided with a pin 99 engaged by a slot 92 in the plate 90. The end 100 of slide 98 is provided with a curved surface 101 (see Fig. 11), for giving the desired form to an outer armature conductor lead. By turning the handle 91 from the position shown in Fig. 7 to that shown in Fig. 8, the slides 98 will be moved radially inwardly.

Armature holding apparatus.

The device for holding an armature while being operated upon includes the tube 52 which receives one end of an armature shaft and a spacing block 110 and a screw 111 which receives the other end of the shaft. Screw 111 is threaded into a plate 112 which is pivoted at one end upon the reduced end of a pedestal 114 and retained by a screw 113. Pedestal 114 is supported by the base 64. The other end of plate 112 is provided with a hook 115 which engages a groove 116 in a pedestal 117, also supported by the base 64. The plate 112 is notched from its outer edge to the threaded hole which receives the screw 111, and the screw 111 is notched from its outer surface to the central hole 118 which receives the armature shaft.

Mode of operation.

The valve 77 is controlled so that the piston in cylinder 74 will move to the extreme right hand position as viewed in Fig. 1. The screws 80 and the nuts 82 are adjusted so that the notches 25 and 45 of the twisting members 24 and 40 respectively, will be in alinement as viewed in Figs. 5 and 9. An armature 200, as shown in Figs. 12 to 15, is placed in position in the machine as shown in Fig. 4. The inner conductor leads 206 are received by the notches 25 and the outer leads 207 by the notches 45. The spacing sleeve 50 separates the outer leads from the inner leads. The handle 91 is turned from the position shown in Fig. 7, to that shown in Fig. 8, causing the forming members 98 to move so that their ends 100 are located between the outer conductor leads 207 and are directly below the armature core as indicated in Fig. 14.

A spacing sleeve 110 is placed over the upper end of the shaft 203 and the plate 112 is swung on its pivot 113 so that the screw 111 will be in alinement with the armature shaft. As plate 112 swings around so that its hooked end 115 is received by the groove 116 in pedestal 117, the notches in plate 112 and in screw 111 will receive the end of the armature shaft which projects above the spacing block 110. The screw 111 is turned so that either the armature core will rest upon the forming slides 98, as indicated in Fig. 14, or so that the lower ends of the conductor leads will engage the bottoms of the notches 25 and 45.

The valve handle 78 is turned so that fluid pressure will be admitted into the right hand end of cylinder 74 to cause the piston rod 73 and racks 60 and 61 to move toward the left, as viewed in Fig. 1. This movement will cause the outer twisting member 40 to be moved in a counter clockwise direction and the inner twisting member 24 to be moved clockwise. Therefore the outer conductor leads will be twisted simultaneously in the same direction with the twisting of the inner conductor leads in the opposite direction as indicated in Fig. 14. As these twisting members rotate in the directions referred to, they will be caused to move upwardly with respect to the bearing 22 by reason of the cooperation of pins 31 with the spiral slots 30 in the hub 23 of the twisting member 24. Consequently, the end portions of the conductor leads received by the notches 25 and 45 will not be pulled out of the notches substantially during the twisting operation. As shown in Fig. 14, the ends of the armature conductors are straight for a substantial distance. A straight portion of an outer lead is in radial alinement with a straight portion of an inner lead, and these pairs of alined leads are all equi-distant from the axis of shaft 203 and are equi-angularly spaced. As a result of this operation, the armature is ready to receive a commutator having notched riser portions, each riser for receiving a pair of alined conductor lead ends.

In order to remove the armature from the machine, the screw 111 is turned, the plate 112 swung aside, and the spacing block 110 removed. The handle 91 is turned from the position shown in Fig. 8 to that shown in Fig. 7 in order to cause the forming slides 98 to be withdrawn from the armature. Then the armature can be removed by lifting it out of the apertures 95 and 96.

The handle 78 is then turned so that the racks 60 and 61 will be moved to the right as shown in Fig. 1. The machine is now ready to perform a subsequent operation.

During the twisting operation the spacing sleeve 50 precludes any possibility of any of the inner conductor leads 206 moving over into a notch 45 which receives an outer conductor lead 207, and vice versa. The outer band 51 prevents any of the outer conductor leads moving out of the notches 45.

While the form of mechanism herein shown and described constitutes a preferred form of embodiment of the invention, it is to be understood that other forms might be adopted, all coming within the scope of the claims which follow.

What is claimed is as follows:

1. Apparatus for manufacturing armatures comprising, in combination, means for holding a bar wound armature having bar conductors extending through the slots of the armature core, means for bending the conductor portions outside the armature core simultaneously, and means for limiting the abruptness of curvature of said conductors produced by bending.

2. Apparatus for manufacturing armatures comprising, in combination, means for holding a bar wound armature having bar conductors extending through the slots of the armature core, means for bending the conductor portions outside the armature core simultaneously, and means for preventing abrupt bending of said conductors at portions thereof where they emerge from the core.

3. Apparatus for bending the ends of bar conductors extending through the slots of an armature core, certain conductors being located in the slots nearer to the axis of the core than others, which comprises, in combination, means for simultaneously displacing the ends of the outer bars in one direction with respect to their respective core slots, and the ends of the inner bars in the opposite direction, and means for preventing abrupt bending of the outer conductors at certain portions thereof.

4. Apparatus for bending the ends of bar conductors extending through the slots of an armature core, certain conductors being located in the slots nearer to the axis of the core than others, which comprises, in combination, means for simultaneously displacing the ends of the outer bars in one direction with respect to their respective core slots, and the ends of the inner bars in the opposite direction, and means for preventing abrupt bending of the outer conductors at portions thereof where the conductors emerge from the core.

5. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members each adapted to receive one of the rows of conductor ends, means for rotating said members in opposite directions in order to bend the conductors, and means for preventing the conductor ends of one row being engaged by the rotatable member for bending the other row of conductors.

6. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for rotating said members in opposite directions in order to bend the conductors, and means for preventing the conductor ends of one row being received by the notches of the rotatable member for bending the other row of conductors.

7. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, gears respectively connected with said members, racks cooperating respectively with said gears, and means for moving the racks.

8. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for rotating said members in opposite directions, means for causing one member to move axially while rotating, and means causing this member to impart axial movement to the other member.

9. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for causing said members to move endwise during rotation thereof, and two devices rotatable coaxially with said members and fixed against endwise movement, each device having a driving connection with one of the rotatable members permitting endwise movement of the member with respect to its actuating device.

10. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for causing said members to move endwise during rotation thereof, two gears rotatable coaxially with said members and having splined connections with the members, respectively, and gear mechanism for operating the gears.

11. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combinaton, two coaxial rotatable members provided with concentric rows of notches adapted respectively to receive the rows of conductor ends, means including spiral cam and cam follower connections with a stationary part and one of said members for causing said members to move endwise during rotation thereof, and two devices rotatable coaxially with said members and fixed against endwise movement, each device having a driving connection with one of the rotatable members permitting endwise movement of the member with respect to its actuating device.

12. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductors ends, means for rotating said members in opposite directions, and a member insertable between certain conductors for preventing turning of the armature.

13. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, a tubular partition between the rows of notches to assist in guiding the ends of the conductors into the notches, means for rotating the members in opposite directions, and means for holding the armature core stationary.

14. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for rotating the members in opposite directions, a plurality of bars each movable adjacent the armature core between certain conductors, and means for advancing and retracting the bars simultaneously with respect to the armature.

In testimony whereof we hereto affix our signatures.

EARL M. POLK.
ROBERT H. AHLERS.

DISCLAIMER.

1,556,891.—*Robert H. Ahlers* and *Earl M. Polk*, Dayton, Ohio. APPARATUS FOR MAKING ARMATURES. Patent dated October 13, 1925. Disclaimer filed October 13, 1927, by the patentees, assignee by mesne assignments, *Delco-Remy Corporation*, consenting.

Hereby enter this disclaimer to that part of the claims in said patent which are in the following words, to wit:

"5. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members each adapted to receive one of the rows of conductor ends, means for rotating said members in opposite directions in order to bend the conductors, and means for preventing the conductor ends of one row being engaged by the rotatable member for bending the other row of conductors.

"6. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for rotating said members in opposite directions in order to bend the conductors, and means for preventing the conductor ends of one row being received by the notches of the rotatable member for bending the other row of conductors.

"7. Apparatus for bending the ends of bar conductors extending through the slots of an armature core, certain conductors being located in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, gears respectively connected with said members, racks cooperating respectively with said gears, and means for moving the racks."

[*Official Gazette November 1, 1927.*]